(12) United States Patent
Smith (10) Patent No.: US 12,170,861 B2
(45) Date of Patent: Dec. 17, 2024

(54) ELECTRONIC MONITORING SYSTEM WITH VARIABLE TARGET WAKE TIME

(71) Applicant: Arlo Technologies, Inc., Carlsbad, CA (US)

(72) Inventor: Vincent Smith, Langley (CA)

(73) Assignee: Arlo Technologies, Inc., Carlsbad, CA (US)

( * ) Notice: Subject to any disclaimer, the term of this patent is extended or adjusted under 35 U.S.C. 154(b) by 148 days.

(21) Appl. No.: 17/951,383

(22) Filed: Sep. 23, 2022

(65) Prior Publication Data

US 2024/0106990 A1   Mar. 28, 2024

(51) Int. Cl.
*H04N 7/18*   (2006.01)
*H04N 23/65*   (2023.01)
*H04N 23/661*   (2023.01)
*H04W 52/02*   (2009.01)

(52) U.S. Cl.
CPC .......... *H04N 7/188* (2013.01); *H04N 23/651* (2023.01); *H04N 23/661* (2023.01); *H04W 52/0225* (2013.01)

(58) Field of Classification Search
CPC .... H04N 7/188; H04N 23/651; H04N 23/661; H04W 52/0225; H04W 52/0216; H04W 52/028; Y02D 30/70
See application file for complete search history.

(56) References Cited

U.S. PATENT DOCUMENTS

| | | | |
|---|---|---|---|
| 9,791,910 B1* | 10/2017 | Brown | G06F 1/324 |
| 2020/0221381 A1* | 7/2020 | Homchaudhuri | H04W 52/0235 |
| 2021/0274444 A1* | 9/2021 | McGill | H04W 36/0088 |
| 2021/0360145 A1* | 11/2021 | Laurans | H04N 23/611 |
| 2022/0201533 A1* | 6/2022 | Sehgal | H04W 52/0216 |
| 2022/0217638 A1* | 7/2022 | Nayak | H04W 52/0258 |
| 2022/0346007 A1* | 10/2022 | Alpert | H04W 52/0216 |
| 2022/0394635 A1* | 12/2022 | Min | H04W 88/02 |
| 2023/0189056 A1* | 6/2023 | Choi | H04W 28/02 370/235 |
| 2023/0276357 A1* | 8/2023 | Cariou | H04W 52/0219 370/311 |
| 2024/0121843 A1* | 4/2024 | Chu | H04W 76/15 |

FOREIGN PATENT DOCUMENTS

CN   111193912 A   5/2020

* cited by examiner

*Primary Examiner* — Jared Walker
(74) *Attorney, Agent, or Firm* — Boyle Fredrickson S.C.

(57) ABSTRACT

An electronic monitoring system is provided that allows for an access point to transmit variable target wake time durations to a wireless device based upon the detection of a categorized triggering event being sensed by the wireless device. The system allows for one or more components to be deactivated during the variable target wake time duration, as to reduce power consumption during periods of inactivity. A method of varying the target wake time duration in a wireless imaging device based upon the detection of a categorized triggering event being sensed by the wireless device is also provided.

20 Claims, 3 Drawing Sheets

ELECTRONIC MONITORING SYSTEM WITH VARIABLE TARGET WAKE TIME

BACKGROUND OF THE INVENTION

1. Field of the Invention

The present invention relates to an electronic monitoring system and, more particularly, to an electronic monitoring system that allows for an access point to transmit variable target wake time durations to a wireless device based upon the detection of a categorized triggering event being sensed by the wireless device. The present invention also relates to a method of varying the target wake time duration in a wireless imaging device based upon the detection of a categorized triggering event being sensed by the wireless imaging device and to a system that performs such a method.

2. Discussion of the Related Art

Cameras have long been used as part of monitoring and/or surveillance systems. More recently, cameras have been coupled with electronic sensors to detect triggering events, such as a detected motion, to allow recording of an area once a triggering event has occurred. Video cameras have also been connected to computers with network access to allow a user to remotely monitor an area with a user device such as a laptop or desktop computer, a smart phone or tablet computer. In one example, a wide-angle passive infrared detector (PIR) is attached to the camera providing a field-of-view (FOV) approximating that of the camera. When the PIR is triggered by motion within an "activity zone" defined by the PIR FOV, the camera may be activated to capture and record video. In such systems, automatic notifications, broadly referred to herein as push notifications ("PNs") can be sent to alert a user of a user device of an event of interest occurring within the field of view of the camera and/or electronic sensor. Upon receiving the push notification, the user can tap the push notification to open a dedicated application program for interacting with video cameras and/or other aspects of the monitoring system.

The cameras in such systems are frequently battery-powered, and combining the camera with a PIR detector can reduce power consumption by allowing initial motion detection by the low-power consumption PIR detector and activation of the high-power consumption camera only as needed.

Additional reduction in power consumption also can be realized by putting the battery-operated camera in a timed sleep mode in which some of its functions are temporarily deactivated. For example, as broadly adopted in devices that utilize the Wireless 6 or 802.11ax standard, access point beacons transmitted from a wireless router or base station to a wireless network device may include a target wake time (TWT) function. In such a system, the beacon may define a duration during which the wireless network device, or client, deactivates its Wireless transceiver as to conserve battery power. The device then operates in a low power consumption state from which it wakes up based upon a real-time clock at a specified TWT interval, at which time the Wireless transceiver is activated, and communication with the access point is reestablished for a defined time period before the device again is placed in sleep mode.

In the context of a wireless imaging device such as a network connected battery powered camera, a preset and non-variable TWT duration is undesirable, as a user's command to engage with the camera functions may fall within the period of Wireless transceiver deactivation, i.e., while the camera is in sleep mode. In this case, execution of the user's command would be postponed until the TWT interval timer expires, resulting in delayed functionality. Thus, it would be desirable to provide an improved electronic monitoring system in which an access point transmits variable target wake time durations to a wireless device based upon the detection of a categorized triggering event being sensed by the wireless device.

SUMMARY OF THE INVENTION

In accordance with a first aspect of the invention, this need is satisfied by providing a wireless device having at least one sensor configured to detect an at least one triggering event, a controller configured to execute a program to define the at least one triggering event as a categorized triggering event, and a transceiver configured to receive a first target wake time (TWT) signal corresponding to a first TWT duration from an access point in the absence of the categorized triggering event. During the TWT duration, the program will deactivate at least one portion or component of the electronic device. In response to the occurrence of a categorized trigging event, the transceiver may receive a second TWT signal corresponding to a second TWT duration from the access point that is different than the first TWT.

A nonlimiting feature of this embodiment is to provide a TWT duration in response to the occurrence of a categorized triggering event during a period of time following the triggering event that is shorter than the TWT duration that would prevail in the absence of a categorized triggering event.

The system may reduce user input lag by reducing the TWT duration directly following the occurrence of the categorized triggering event while also maintaining a reduction in power consumption.

A nonlimiting feature of this embodiment is to provide a stepwise increase in the TWT duration during an elongated period following the occurrence of the categorized triggering event.

The system may iteratively transition from a period of reduced TWT duration directly following the occurrence of the categorized triggering event to a longer TWT duration in the absence of a categorized triggering event as to decrease the possibility of user lag through a correlation between TWT duration length and probability of user interaction with the system following a categorized triggering event.

A nonlimiting feature of this embodiment is to deactivate one or more portions of the wireless device during the TWT duration. The deactivated portion(s) could be, for example, one or more of a wireless or Wireless module, a motion detector, an IR sensor, a microphone, an imaging sensor, and a camera.

The electronic monitoring system can customize the degree of battery power savings realized during TWT durations by selecting those components to deactivate during the TWT duration.

A nonlimiting feature of this embodiment is to increase the TWT duration when a user's mobile device and the electronic monitoring system's access point are connected to the same wireless network.

The electronic monitoring system may increase battery power reduction by lengthening the TWT duration when the user is on the physical premises of the monitoring system and, as such, may require less interaction with or reliance on the system.

A nonlimiting feature of this embodiment is to categorize the triggering event, as either a genus level triggering event and/or a species level triggering event, where the post-categorized trigger event TWT duration differs depending on genus or species level categorization. The terms "genus" and "species" as used herein simply refer to a set and a subset of that subset respectively. There can be various levels of genus and species. For example, a person can be considered a genus and a delivery person could be species within that genus. Drilling down a level further, a mail carrier could be a species of the genus delivery person. Drilling down still a level further, Jill could be a species of the genus mail carrier. The levels between the uppermost levels and the bottom-most level also could be considered "subgenuses." For the sake of simplicity, unless otherwise noted in a particular example, the term "genus" will encompass both genuses and sub-genuses.

The electronic monitoring system can categorize triggering events into a hierarchical classification via which species level categorized triggering events are associated with an increased occurrence of user interaction with the system and support a reduced TWT duration than do genus level categorized triggering events.

Another embodiment of the present invention provides a method for electronic monitoring including a first step of receiving at a wireless imaging device a first target wake time (TWT) signal corresponding to a first TWT duration from an access point and deactivating at least a wireless module of the wireless imaging device during the first TWT duration. Then, detecting a triggering event comprising at least one of a motion and a sound and using the wireless imaging device to capture and record data. The method then categorizes the triggering event and assigning a second TWT duration to the categorized triggering event that is less than the first TWT duration. Finally, a second TWT signal corresponding to the second TWT duration is received at the wireless imaging device and at least the Wireless module of the wireless imaging device is deactivated during the second TWT duration.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
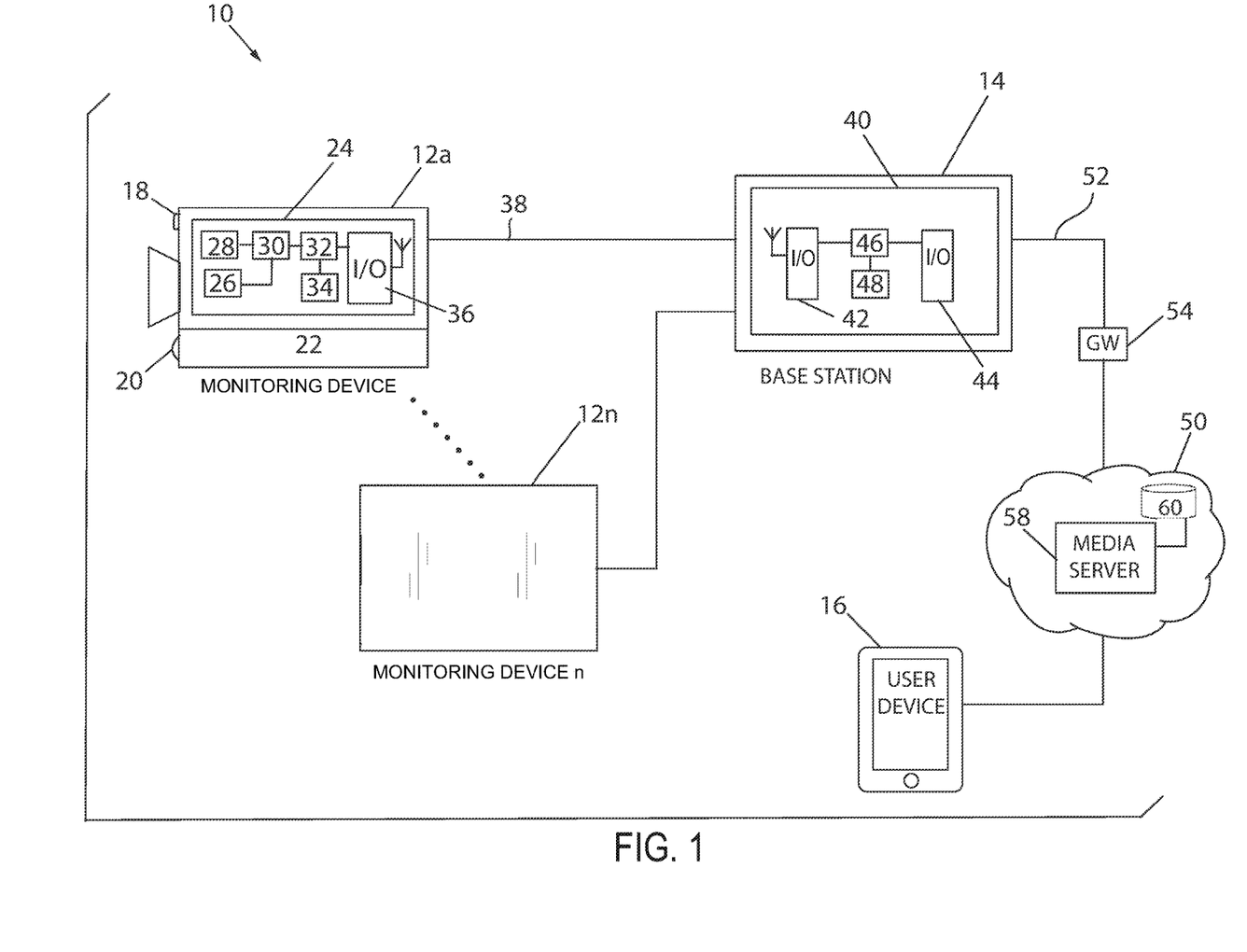
FIG. 1 is a block diagram of a system for electronic monitoring in which detection of a triggering event by an imaging device can cause a custom audio and/or visual alert push notification to be sent to a user device in accordance with an aspect of the invention.

Referring now to FIG. 1, in accordance with an aspect of the invention, an electronic system 10 for real-time monitoring can include one or more imaging devices 12 and a hub or base station 14. A number "n" 12a-12n images devices are schematically illustrated in FIG. 1. Unless otherwise specified, all references to an "imaging device" 12 should be construed to apply equally to equally to any of the imaging devices 12a-12n. One or more user devices 16, such as a smart phone, tablet, laptop, or PC may communicate with the base station 14. Each user device includes a display that typically includes both an audio display and a video display, internal computing and storage capabilities, and a program or application servicing as a user interface with the remainder of the system 10.

Each imaging device 12 is configured to acquire data and to transmit it to the base station 14 for further processing and/or transmission to a server 58 and/or the user device(s) 16. Each imaging devices 12 may be battery powered or wired. The acquired data typically will correspond to a video image, and each imaging device 14 may be or include a camera such as a video camera 24. Several such imaging devices may be mounted around a building or other structure or area being monitored. For example, in the case of a residential home, imaging devices 12 could be mounted by each entrance and selected windows. An imaging device 12 also could be incorporated into or coupled to a doorbell, floodlight, etc. Still referring to FIG. 1, one or more of the imaging devices 12 may also include a microphone 18, visible and/or infrared (IR) lights 20, a power supply 22, and/or imaging device electronic circuitry 24. Circuit 24 may include an imager 26, an audio circuit 28, a media encoder 30, a processor 32, a non-transient memory storage 34 and/or a wireless I/O communication device 36, among other things. Each imaging device 12 can be in communication with the base station 14 through a network such as a private Wireless Local Area Network (WLAN) 38, hosted by the base station 14 operating as an access point. One such network is an IEEE 802.11 network.

Still referring to FIG. 1, the hub or base station 14 can include base station electronic circuitry 40, including a first wireless I/O communication device 42 for communicating with the imaging devices 12 over the WLAN 38, a second wired or wireless I/O communication device 44 for accessing the Wide Area Network (WAN) 50, such as the Internet through a Local Area Network (LAN) 52 connected to a gateway or modem 54, a processor 46 and/or a non-transient memory storage 48, among other things. It should be apparent that "circuity" in this regard can comprise hardware, firmware, software, or any combination thereof. In one aspect, the imaging devices 12 could be Arlo® cameras, and the base station 14 could be an Arlo® base station, each available on a stand-alone basis or as part of any of a number of systems available from Arlo Technologies, Inc. of Carlsbad, California. The circuitry and functionality of the gateway router 54 and the base station 14 also could be incorporated into a single router, in which case the router (in this case gateway router 54) also would serve as the base station.

The base station 14 may also be in communication with a server 58, which may be a cloud-server accessible via the WAN 50. The server 58 can include or be coupled to a microprocessor, a microcontroller or other programmable logic element configured to execute a program. This program, while operating at the server level, may be utilized in filtering, processing, categorizing, storing, recalling and transmitting data received from the imaging device 12 via the base station 14.

An alternative embodiment of the electronic system 10 for real-time monitoring can include one or more imaging devices 12, and still refereeing to FIG. 1, the wireless I/O communication device 36 disposed within the imaging device 12 may be a wireless transceiver that communicates with a wireless gateway router 54. For example, the imaging device 12 located in the user's home may, via the wireless gateway router 54, communicate with a remote server 58 including one or more computers processors, such as a cloud-based processor, through the Internet 50. In such an embodiment, the wireless transceiver 36 of the imaging device may communicated with the wireless router 54, for example, using the IEEE 802.11 standards in accordance with the Wireless communication protocol, and more particularly IEEE 802.11ax or Wireless 6 standards.

In operation, each imaging device 12 can be configured, though suitable mounting of the imaging device 12 and/or through suitable manipulation of its controls, to monitor an area of interest, such as a part of a building or section of property. An imaging device 12 may be commanded to capture images through the transmission of a command from a user device 16. An imaging device 12 also may capture images automatically upon detection of a triggering event detected by a detector or sensor 26 on the imaging device and/or on another imaging device. Alternatively, the device 12 may include one or more alternative imagers, including but not limited to, a thermal imager, a radar, or a relatively high-powered RF sensor. Stand-alone or dedicated sensors also are contemplated. The triggering event may be motion, and the detector may be a motion detector. Instead of or in addition to detecting motion, the detector could include an IR or PIR sensor detecting heat, such as the body heat of an animal or person. Alternatively, the sensor may be an alternative low power sensing device, including but not limited to, a radar sensor, an ultrasonic sensor, or a time of flight (TOF) sensor. The triggering event also could be sound, in which case the detector may include the microphone 18. In this case, the triggering event may be a sound exceeding a designated decibel level or some other identifiable threshold. Upon receiving notification from an imaging device 12 of a triggering event, the system 10 can generate alerts such as push notifications ("PN"), to send an alert or PN to one or more user devices 16 for indicating the triggering event.

Whether camera operation is triggered by a command from a user device 16 or by detection of a triggering event, the camera 24 may then capture a raw video stream which, in turn, can be provided to the media encoder 30 for producing video packets in an encoded video stream. Similarly, the microphone 18 and the audio circuit 28 can capture a raw audio stream which, in turn, can be provided to the media encoder 30 for producing audio packets in an encoded audio stream. Accordingly, the video and/or audio packets, referred to herein as "media" packets, are provided in an encoded media stream. Under control of the processor 32 executing the program, the encoded media stream can be transmitted from the wireless transceiver or wireless I/O communication device 36 to the base station 14 or router 54.

The media stream may then be transmitted via the WAN 50 to a remote data storage device 60 in communication with a media server 58, for data storage in the form of a recording and processing. The storage device 60 may be a cloud-based storage device, and the media sever 58 may be a cloud server accessible via a WAN or internet 50. The server 58 can include or be coupled to a microprocessor, a microcontroller or other programmable logic element (individually and collectively considered "a controller") configured to execute a program. The controller may be contained in whole in the base station 14 or the server 58. Alternatively, interconnected aspects of the controller and the programs executed by it could be distributed in various permutations within the imaging device 12, the base station 14, the gateway router 54, the user device 16, and the server 58. This program may be utilized in filtering, processing, categorizing, storing, recalling and transmitting data received from the imaging device 12 via the base station 14 or router 54. Server 58 may also communicate with or include a computer vision program ("CV"), which can apply one or more filters or processes, such as edge detection, facial recognition, motion detection, etc., to detected one or more characteristics of the recording such as, but not limited to, identifying an individual, animal, vehicle, or package present in the media stream.

In one embodiment of the present invention, in which the imaging device 12 is wireless and battery powered, conservation of the imaging device power supply 22 will increase the length between battery recharges and/or battery replacement. Temporary deactivation of one or more power consuming portions or components of the imaging device 12 will correspondingly account for a decrease in power consumption and an increase in battery life. When communicating wirelessly such as via Wi-Fi communication protocol, such as IEEE 802.11ax or Wi-Fi 6 standards, access point beacons transmitted from either the wireless router 54 to the imaging device 12 may include a target wake time (TWT) function. More specifically, the beacon may define a duration during which the one or more features of the imaging device 12 is deactivated. The deactivated feature may be one or more portions of the device's circuitry, one or more modules or components, or one or more circuits. Each deactivated feature will hereafter be referred to individually and collectively as a "portion" for the sake of conciseness. By way of nonlimiting example, a deactivated portion may be the wireless transceiver 36, which is a relatively high-power consuming component of the imaging device 12, may be deactivated for a duration of time specified by the TWT function of the beacon, as to conserve battery power. The imaging device 12 then operates in a low power consumption state, with its wireless transceiver 36 and/or other electrical components deactivated, until the expiration of the TWT duration, at which time the wireless transceiver 36 is activated and communication with the router 54 or base station 14 (if present) is reestablished. However, it should be understood that one or more additional portions of the imaging device 12 may also be deactivated during the TWT duration, including but not limited to the motion detector or IR sensor 20, microphone 18, imaging sensor 26 and camera 24.

Increasing the TWT duration will correspond to a reduction in power consumption at the imaging device 12. However, in such an embodiment, a user command initiated through the user device 16 may not be executed by the imaging device 12 until communication between the wireless transceiver 36 and router 54 or base station 14 (if present) is reestablished after expiration of the TWT duration. That is to say, at least some user commands are delayed while portions of the imaging device are deactivated during the TWT duration. Those user command cannot be executed until after the imaging device awakes in response to receipt of the user command. There is a necessary lag between receipt of the user commend and full activation or functionality of the previously deactivated device components. As such, while increasing TWT duration may result in longer imaging device battery life, it does so at the risk of increased delay in user instruction execution in the system 10.

Accordingly, the present inventors have developed a system and method in which the TWT duration may be varied, typically by being abbreviated, in response to a triggering event occurring within the FOV of an imaging device. Furthermore, the present inventors have also developed a system and method that varies TWT duration as a function of a categorized triggering event, as will be described in further detail below.

Upon receiving notification from an imaging device 12 of a triggering event, e.g., visual movement or sound, and/or identification of the triggering event classification, e.g., person, animal, vehicle, or package present in the recording, provided by the CV program, the server 58 may generate an alert such as a push notification ("PN") to one or more user devices 16 for indicating the triggering event. The PN can include preconfigured routing information, and a unique identification number ("UID"), for routing the PN to the user device 16, and for distinguishing one PN from another, respectively. It should be appreciated that a single PN having a UID can be sent based on an imaging device 12 detecting a single triggering event. However, multiple PN's having differing UID's can also be sent based on multiple triggering events, such as an imaging device 12 detecting multiple triggering events, or multiple imaging devices 12 detecting a single or multiple triggering events.

The nature or classification of the triggering event may be determined at the server 58, which may include or be in communication with the CV program that can apply one or more filters or processes, such as edge detection, facial recognition, motion detection, etc., to detected one or more characteristics of the recording such as, but not limited to, identifying an individual, animal, vehicle, or package present in the media stream. For example, the imaging device 12 may sense a triggering event that is categorized at the genus level. Such genus level categorized triggering event may include: motion detection of a generic or unspecified object. The object may be, for example, a person, a vehicle, an animal, or a sound. Furthermore, such triggering event may be detected and categorized directly by the imaging device 12 without the need for server level integrated computer vision processing via CV program. However, it is also considered within the scope of the present invention that some genus level categorized triggering events, such as but not limited to human person detection, vehicle detection and animal detection may require computer vision processing either at a via CV program located at the server 58 or base station 14.

In addition to genus level categorized triggering events, one or more triggering events may be categorized by the system 10 at a species level, which is to say a unique triggering event relative to a common genus category. Objects capable of causing such species level categorized triggering events may include: a specific individual person detected by, for example, facial recognition, retinal identification, voice identification, walking gate identification, etc.; a specific vehicle detected by identification of, for example, via license plate number, vehicle profile, vehicle marking/signage identification etc.; a specific animal such as a family pet whose detected, for example, by comparison of the image to a stored image of the pet; package drop-off and pick-up detection that can be detected by recognition of common package shape and size, and activity zone detection within a subset of a field of view of an imaging device 12. It should again be understood that the listing of triggering events and the associated objects categorized at the species level, provided above, are representative examples offered by way of non-limiting example. Furthermore, while such triggering event identification and categorization may be detected via computer vision processing, it should be understood that such CV based identification may occur either via a CV program in communication with the server 58, or alternatively within the hub or base station 14 prior to transmitting the media packets to the server 58, or within the imaging device 12 itself.

As mentioned above, it is also possible to have intermediate levels of detection. Hence, in addition to detecting an unspecified person and, a person as being a member of a specified class or subset, and an individual within that subset. As another example, it is possible to detect a generic animal, a specific type of animal such as a dog, and a specific dog such as "FIDO" the family pet.

Returning now to the modulation of the TWT duration, the present inventors have identified a correlation between the occurrence of categorized triggering event and the frequency of user instructions, such as a request for live video feedback or initiating two-way communication between the user device 16 and imaging device 12 by the user device 16. For example, a greater frequency of user instructions are received within an initial or first interval of approximately 0 to 60 minutes, and more typically 0 to 5 minutes, following the detection of a categorized triggering event, as compared to user instructions received in the absence of any categorized triggering event. Furthermore, the frequency of user instructions that are received within a secondary interval, following the initial or first interval, of approximately 1 to 24 hours, and more preferably 1 to 5 hours, are greater than those received in the absence of any categorized triggering event but less than those received in the initial or first interval.

Figure 2A:
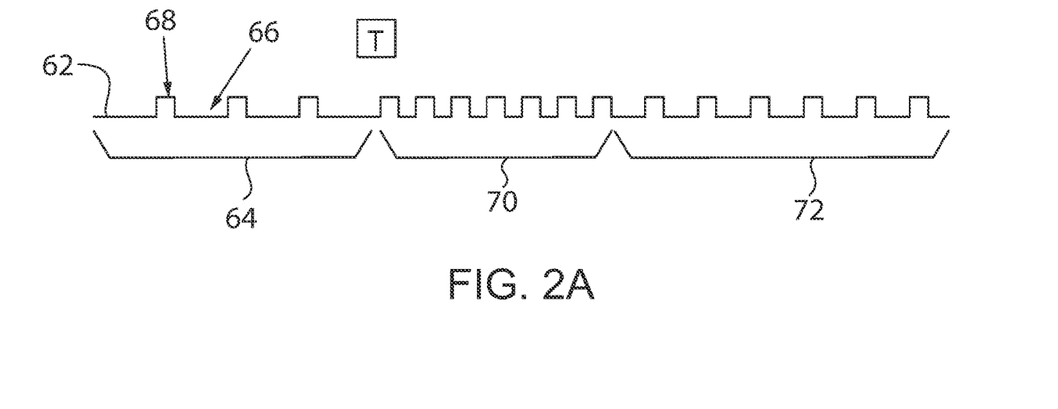
FIGS. 2A through 2C are timeline diagrams displaying variations in TWT duration in an electronic monitoring system in various embodiments of the present invention.
Figure 2B:
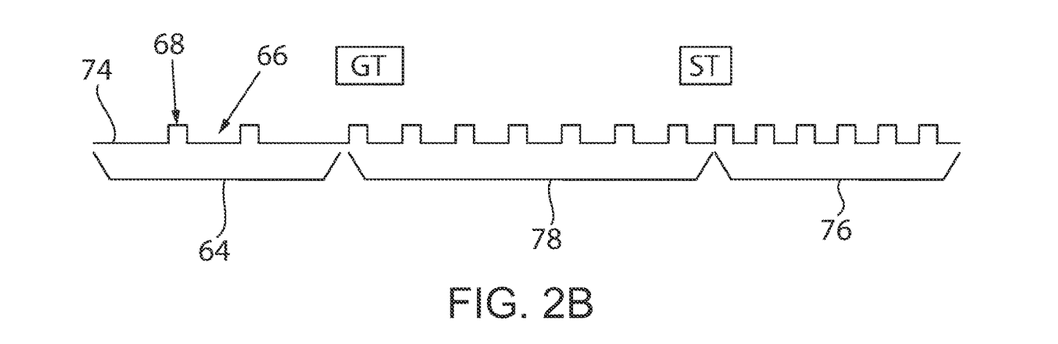
Figure 2C:
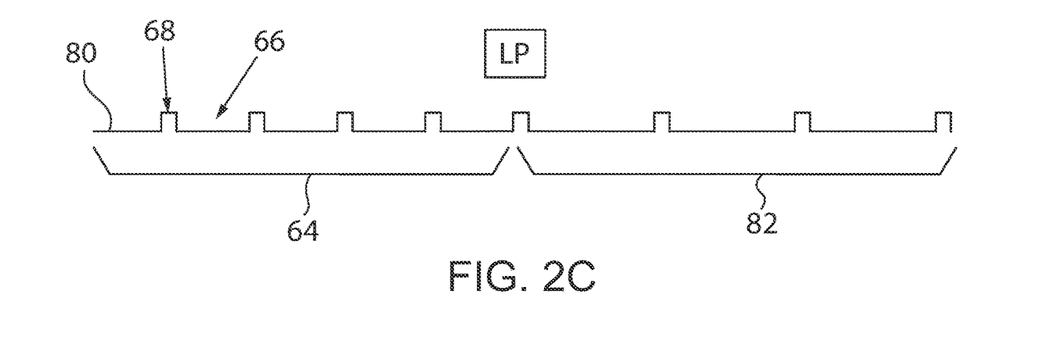

In one embodiment of the present invention, the TWT duration is modulated to correspond to periods of increased occurrence of user instruction input. Referring now to FIG. 2A-2C, and initially FIG.2A, as shown on timeline 62 illustrating TWT frequency and duration before and after a triggering event. During a time 64, the TWT duration 66, i.e., wireless transceiver deactivation within the imaging device 12, which occurs between periods 68 of wireless transceiver activation, is greatest in the absence of a triggering event "T". During interval 70 commencing with a triggering event T, the TWT duration 66 is reduced to a comparatively short duration. Although not shown, the activation periods between TWTs during this interval also could be longer than during time period preceding the triggering event T. A secondary interval 72, following the initial interval 70, may provide an intermediate TWT that greater than that of the initial period 70 and less than that of the time 64 in the absence of a triggering event T. The duration of each TWT in secondary interval could be the same as or different from those of intervals 64 and 70.

For example, during an initial interval 70 the approximately 0 to 60 minutes, and more preferably 0 to 5 minutes following the detection of any categorized triggering event T the TWT duration 66 may be reduced to between approximately 100 milliseconds and 10 seconds, and more typically 100 milliseconds to 5 seconds. During the secondary interval 72 of approximately 5 minutes to 24 hours, and more typically 5 minutes to 1 hour following the initial interval 70, the TWT duration 66 may be modified to between approximately 5 seconds and 1 hour, and more typically 5 to 15 seconds. A tiered or stepwise approach to increasing the TWT duration 66 of the imaging device 12 following the occurrence of the triggering event T minimizes the system 10 delay in user instruction execution while maintaining benefits of reduction of power consumption.

In addition to modulating the TWT duration relative to the occurrence of the triggering event, in another embodiment of the present invention the system may vary TWT duration 66 as a function of the triggering event categorization as shown on the timeline 74 in FIG. 2B. Specifically, those triggering events categorized at the species level triggering events "S.T." may correspond to a period of increased occurrence of user instruction input as compared to those triggering events categorized at the genus level triggering events "G.T.". By way of example, a user may more frequently request to initiate two-way communication with the imaging device 12 when a known individual is located in the FOV of the cameras 24, i.e., a species level event, as compared to an unknown person, i.e., a genus level event. Accordingly, in one embodiment of the present invention, the TWT duration 66 during an interval of time 76 directly following the occurrence of a species level categorized triggering event S.T. is less than the corresponding TWT duration 66 during the interval of time 78 following a genus level triggering event G.T. The TWT duration during both intervals 76 and 74 are smaller than the TWT duration during the interval 64 preceding any triggering event, i.e., before GT in this example. Again, the duration of the TWTs during intervals 76 and 78 could differ relative to each other and relative to the TWT during interval 64.

In another embodiment of the present invention, as shown on timeline 80 in FIG. 2C, modification of the TWT duration 66 may further depend upon metering of the power supply 22. For example, when the power supply 22 of the imaging device 12 falls below a predetermined threshold at time "LP", the system 10 may enter a low power state. During the ensuing time period 82 when the imaging device 12 is in the low power state, the TWT duration 66t may be increased relative to the time 64 when the power supply 22 exceeds the low power threshold. For example, if the TWT duration 66 of the system 10 in the absence of a triggering event is approximately between 10 mins and 5 hours, the system may increase the TWT duration in the absence of a triggering event to approximately between 1 and 24 hours once the power supply 22 level falls below a predetermined threshold and into the low power state. The threshold may be user-selected or preprogramed to be approximately between 1 and 10 percent of the full capacity of the power supply 22. Of course, this control also could be combined with one responding to a triggering event, such as one or both discussed above in connection with FIGS. 2A and 2B.

Figure 3:
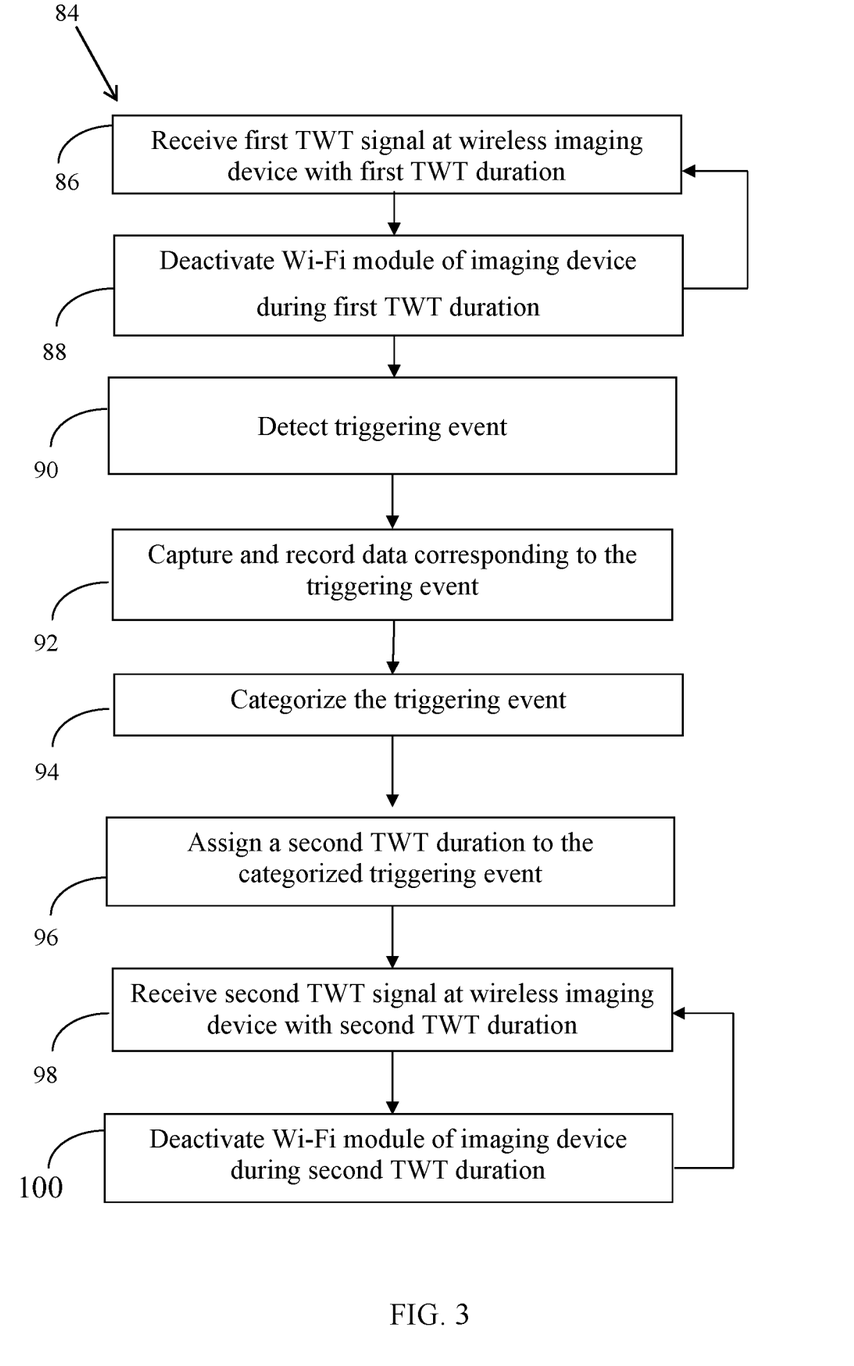
FIG. 3 is a flow chart for a method of modulating the TWT duration in an electronic monitoring system in response to a categorized triggering event

Turning now to FIG. 3, a method 84 of varying the TWT duration of a wireless battery powered imaging device 12 in an electronic monitoring system 10 is shown. At initial step 86, an AP beacon having a first TWT signal corresponding to a first TWT duration in the absence of a categorized triggering event is received at the wireless imaging device 12 from the access point, which may constitute either a base station 14 or gateway router 54. In response to receiving the first TWT signal, at least one portion of the wireless imaging device 12 is deactivated during the first TWT duration at subsequent step 88. In one embodiment the portion of the wireless imaging device that is deactivated includes the relatively high-power consuming wireless transceiver 36 or corresponding wireless module of the electrical circuit of the imaging device 12. Upon expiration of the first TWT duration, the deactivated portion(s) of the wireless imaging device 12 is/are activated for a period of time that is typically substantially shorter than the TWT. The process then returns to block 86, and steps 86 and 88 are repeated in a continuous cycle in the absence of a triggering event or user input instruction included in the AP beacon of step 86.

Upon the occurrence of a triggering event in the FOV of the imaging device 12, at a subsequent step 90 the imaging device 12 will detect the triggering event that may include, for example, motion and/or sound. Once detected, at subsequent step 92, the wireless imaging device 12 will capture and record data within the FOV to form media packets. At subsequent step 94 the media packets may be processed by the CV program that is contained in or in communication with the server 58 through network 50, or alternatively processed directly within base station 14, to identify and categorize the triggering event. In one nonlimiting example of the present invention categorizing the triggering event may include specifying the triggering event as a genus or species level triggering event.

After the triggering event has been categorized, at subsequent step 96 a second TWT duration that typically is less than the first TWT duration will be assigned to the categorized triggering event. An AP beacon having a second TWT signal corresponding to the second TWT duration, following the occurrence of the categorized triggering event, is received at the wireless imaging device 12 from the access point in step 98. In response to receiving the second TWT signal, at least one portion of the wireless imaging device 12 is deactivated during the second TWT duration at subsequent step 100. In one embodiment the portion of the wireless imaging device that is deactivated includes the wireless transceiver 36. It is conceivable that different portion(s) could be deactivated depending on whether the TWT is the default TWT or is selected based upon the detected triggering event. In any event, upon expiration of the second TWT duration, the deactivated portion of the wireless imaging device 12 is activated, in order to repeat steps 98 and 100 during a predetermined interval following the occurrence of the categorized triggering event. Repeating steps 98 ad 100 during the predetermined interval following the occurrence of the categorized triggering event facilities rapid execution of a user input instruction included in the AP beacon of step 86.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. An electronic monitoring system comprising:
   a wireless device comprising an electrical circuit including at least one sensor configured to detect an at least one triggering event and to capture data corresponding to the triggering event;
   a controller in communication with the wireless device, the controller executing a program stored in a non-transient medium and operable to define the at least one triggering event as a categorized triggering event; and, a transceiver in electrical communication with the circuit configured to receive a first target wake time (TWT) signal corresponding to a first TWT duration in the absence of the categorized triggering event;

wherein the transceiver is configured to receive a second TWT signal corresponding to a second TWT duration that is different than the first TWT in response to the categorized triggering event;

the program further operable to deactivate the transcriver during each TWT duration and subsequently activate the transcriver after each TWT duration.

2. The system of claim 1, further comprising an access point that is configured to transmit the TWT signals to the wireless device.

3. An electronic monitoring system comprising:

a wireless device comprising an electrical circuit including at least one sensor configured to detect an at least one triggering event and to capture data corresponding to the triggering event;

a controller in communication with the wireless device, the controller executing a program stored in a non-transient medium and operable to define the at least one triggering event as a categorized triggering event; and, a transceiver in electrical communication with the circuit configured to receive a first target wake time (TWT) signal corresponding to a first TWT duration in the absence of the categorized triggering event;

wherein the transceiver is configured to receive a second TWT signal corresponding to a second TWT duration that is different than the first TWT in response to the categorized triggering event;

the program further operable to deactivate at least one portion of the electrical circuit during each TWT duration and subsequently activate the at least one portion of the electrical circuit after each TWT duration;

an access point that is configured to transmit the TWT signals to the wireless device; and wherein the second TWT duration is less than the first TWT duration and the access point is configured to repeatedly transmit the second TWT signal to the wireless device for a first predetermined interval following detection of the categorized triggering event.

4. The system of claim 3, wherein the second TWT duration is between 100 milliseconds and 5 seconds and the first predetermined interval is less than 20 minutes.

5. The system of claim 3, wherein the transceiver is configured to receive a third TWT signal corresponding to a third TWT duration, and wherein the access point is configured to repeatedly transmit the third TWT to the wireless device for a second predetermined interval after the first predetermined interval has elapsed.

6. The system of claim 5, wherein the third TWT duration is greater than the second TWT duration and less than the first TWT duration.

7. The system of claim 6, wherein the third TWT duration is greater than 5 seconds milliseconds and less than 1 hour and the second predetermined interval is less than 24 hours.

8. The system of claim 1, wherein the program is further operable to deactivate at least one portion of the electrical circuit during each TWT duration, wherein the at least one portion of the electrical circuit is one or more of a wireless module, a motion detector, an IR sensor, a microphone, an imaging sensor, and a camera.

9. The system of claim 2, further comprising a user device in wireless communication with the access point, and wherein the first TWT duration is configured to increase when the user device and the access point are in wireless communication with a common wireless network.

10. The system of claim 1, wherein the categorized triggering event is defined bythe program as either a genus level triggering event or a species level triggering event;

wherein the genus level triggering event is one or more of an unspecified person, detection of an unspecified vehicle, detection of an unspecified animal, detection of unspecified motion, detection of an unspecified sound, or detection of motion within an unspecified area within the field of view of the imaging device, and, wherein the species level triggering event is one or more of a specified person or a designed class of people, detection of a specified vehicle or vehicle type, detection of a specified animal or animal species, detection of a package, detection of a specified sound, or detection of a specified motion within a specified area within a field of view of the imaging device.

11. The system of claim 10, wherein the second TWT duration of a species level triggering event is less than the second TWT duration of a genius level triggering event.

12. The system of claim 1, wherein the controller further receives a wireless sensor power supply value, and wherein, when the wireless sensor power supply value is less than a predetermined threshold, the TWT duration is modified to be greater than the first TWT duration.

13. An electronic monitoring system comprising:

a wireless imaging device comprising an electrical circuit including at least one sensor configured to detect an at least one triggering event comprising at least one of a motion or a sound and to capture data corresponding to the triggering event; and a controller in communication with the wireless imaging device, the controller executing a program stored in a non-transient medium and operable to categorize the at least one triggering event as a genus level triggering event or a species level triggering event;

a transceiver in electrical communication with the circuit configured to receive a first target wake time (TWT) signal from an access point corresponding to a first TWT duration wherein the transceiver is configured to receive a second TWT signal from the access point corresponding to a second TWT duration that is less than the first TWT in response to the categorizing the trigger event, wherein the second TWT duration of the species level triggering event is less than the second TWT duration of the genius level triggering event;

the program further operable to deactivate the transceiver during each TWT duration and subsequently activate the transceiver after each TWT duraction.

14. The system on claim 13, wherein the second TWT duration is between 100 milliseconds and 5 seconds, and wherein the access point is configured to repeatedly transmit the second TWT signal to the wireless imaging device for a first predetermined interval of less than 20 minutes following detection of the categorized triggering event.

15. The system of claim 14, wherein the transceiver is configured to receive a third TWT signal from the access point corresponding to a third TWT duration that is greater than the second TWT duration and less than the first TWT duration, and wherein the access point is configured to repeatedly transmit the third TWT to the wireless device for a second predetermined interval after the first predetermined interval has elapsed.

16. The system of claim 15, wherein the third TWT duration is greater than 5 seconds milliseconds and less than 1 hour and the second predetermined interval is less than 24 hours.

17. The system of claim 13, wherein the program is further operable to deactivate at least one portion of the electrical circuit during each TWT duraction, wherein the at least one portion of the electrical circuit is selected from a wireless module, a motion detector, an IR sensor, a microphone, an imaging sensor, and a camera.

18. The system of claim 13, wherein the genus level triggering event is selected from detection of an unspecified person, detection of an unspecified vehicle, detection of an unspecified animal, detection of unspecified motion, detection of an unspecified sound, or detection of motion within an unspecified area within the field of view of the imaging device, and,
wherein the species level triggering event is selected from detection of a specified person or a designed class of people, detection of a specified vehicle or vehicle type, detection of a specified animal or animal species, detection of a package, detection of a specified sound, or detection of a specified motion within a specified area within a field of view of the imaging device.

19. The system of claim 13, wherein the controller further receives a wireless sensor power supply value, and wherein, when the wireless sensor power supply value is less than a predetermined threshold, the TWT duration is modified to be greater than the first TWT duration.

20. A method for varying target wake time duration in a wireless imaging device comprising:
 (a) receiving, at a wireless imaging device, a first target wake time (TWT) signal corresponding to a first TWT duration;
 (b) deactivating a transceiver during the first TWT duration;
 (c) after the first TWT duration, detecting a triggering event comprising at least one of a motion and a sound;
 (d) upon detecting the triggering event, using the wireless imaging device, capturing and recording data;
 (e) categorizing the triggering event;
 (f) assigning a second TWT duration to the categorized triggering event, the second TWT duration being less than the first TWT duration;
 (g) receiving, at the wireless imaging device, a second TWT signal corresponding to the second TWT duration;
 (h) deactivating the transceiver during the second TWT duraction.

* * * * *